(12) United States Patent
Sasaki

(10) Patent No.: US 11,031,963 B2
(45) Date of Patent: Jun. 8, 2021

(54) MODULE CONNECTION STRUCTURE AND MEASURING INSTRUMENT

(71) Applicant: Yokogawa Electric Corporation, Tokyo (JP)

(72) Inventor: Keiichi Sasaki, Tokyo (JP)

(73) Assignee: Yokogawa Electric Corporation, Musashino (JP)

(*) Notice: Subject to any disclaimer, the term of this patent is extended or adjusted under 35 U.S.C. 154(b) by 0 days.

(21) Appl. No.: 16/662,262

(22) Filed: Oct. 24, 2019

(65) Prior Publication Data

US 2020/0145035 A1  May 7, 2020

(30) Foreign Application Priority Data

Nov. 2, 2018 (JP) .............................. JP2018-207704

(51) Int. Cl.
*H04B 1/08* (2006.01)
*B60R 16/023* (2006.01)

(52) U.S. Cl.
CPC ......... *H04B 1/082* (2013.01); *B60R 16/0238* (2013.01); *B60R 16/0239* (2013.01)

(58) Field of Classification Search
CPC .... H04B 1/082; H04B 1/086; B60R 16/0238; B60R 16/0239; B60R 11/02
USPC ............... 381/86, 365, 302, 389; 248/346.01
See application file for complete search history.

(56) References Cited

U.S. PATENT DOCUMENTS

| 3,910,156 | A | * | 10/1975 | Soltysik ................ F16B 13/122 411/61 |
| 4,585,366 | A | | 4/1986 | Uchida |
| 6,050,764 | A | | 4/2000 | Oberle et al. |
| 6,679,666 | B2 | * | 1/2004 | Mizuno ................ F16B 43/001 411/353 |
| 2008/0072670 | A1 | | 3/2008 | Brandmeier et al. |
| 2013/0154361 | A1 | | 6/2013 | Shoji |
| 2015/0139722 | A1 | * | 5/2015 | Yamada ............... H05K 7/1007 403/327 |

FOREIGN PATENT DOCUMENTS

| JP | 06-140097 | A | 5/1994 |
| JP | 2017-116027 | A | 6/2017 |
| WO | 2010/117080 | A1 | 10/2010 |
| WO | 2012/081051 | A1 | 6/2012 |

* cited by examiner

*Primary Examiner* — Vivian C Chin
*Assistant Examiner* — Con P Tran
(74) *Attorney, Agent, or Firm* — Sughrue Mion, PLLC

(57) ABSTRACT

A module connection structure includes a first module, a second module connected to the first module via connectors, and fixing members that fix the second module to the first module. The fixing members are movable between a fixed position at which the second module is inseparable from the first module and an unfixed position at which the second module is separable from the first module. At least one of the first module and the second module has fixing member holders that hold the fixing members located at least at the unfixed position.

14 Claims, 10 Drawing Sheets

MODULE CONNECTION STRUCTURE AND MEASURING INSTRUMENT

BACKGROUND

Technical Fields

The present invention relates to a module connection structure and a measuring instrument.

Priority is claimed on Japanese Patent Application No. 2018-207704, filed on Nov. 2, 2018, the contents of which are incorporated herein by reference.

Related Art

A module connection structure that relates to an in-vehicle information device in which internal circuit boards are connected by a connector for board-to-board connection is disclosed in WO2012/081051. The module connection structure assembles a display unit (a second module) in which an LCD substrate having a display function is housed to a device body (a first module) in which a substrate for navigation having a navigation function is stored. The display unit is positioned with the connector connected to the device body, and is fixed to the device body by a plurality of fastening screws (fixing members).

Meanwhile, in the module connection structure, if the fixation by the fixing members is released, the second module can be demounted from the first module, and be replaced with a new one. However, there is a risk of the fixing members falling from the module when the fixation is released. The fixing members are generally formed of small parts (e.g., fastening screws), and thus are easily lost once they fall from the module. When the fixing members are lost, spares of the fixing members should be prepared. Further, in a measuring instrument or the like installed in an explosion-proof area, the lost fixing members may have any influence on a field, and the loss of the fixing members may not be permitted.

SUMMARY

A module connection structure includes a first module, a second module connected to the first module via connectors, and fixing members that fix the second module to the first module. The fixing members are movable between a fixed position at which the second module is inseparable from the first module and an unfixed position at which the second module is separable from the first module. At least one of the first module and the second module has fixing member holders that hold the fixing members located at least at the unfixed position.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a module connection structure and a measuring instrument capable of preventing falling of fixing members that fix modules. Further, an aspect of the present invention is to provide a module connection structure and a measuring instrument capable of maintaining reliability of connection between connectors of modules.

Hereinafter, an embodiment of the present invention will be described with reference to the drawings.

Figure 1:
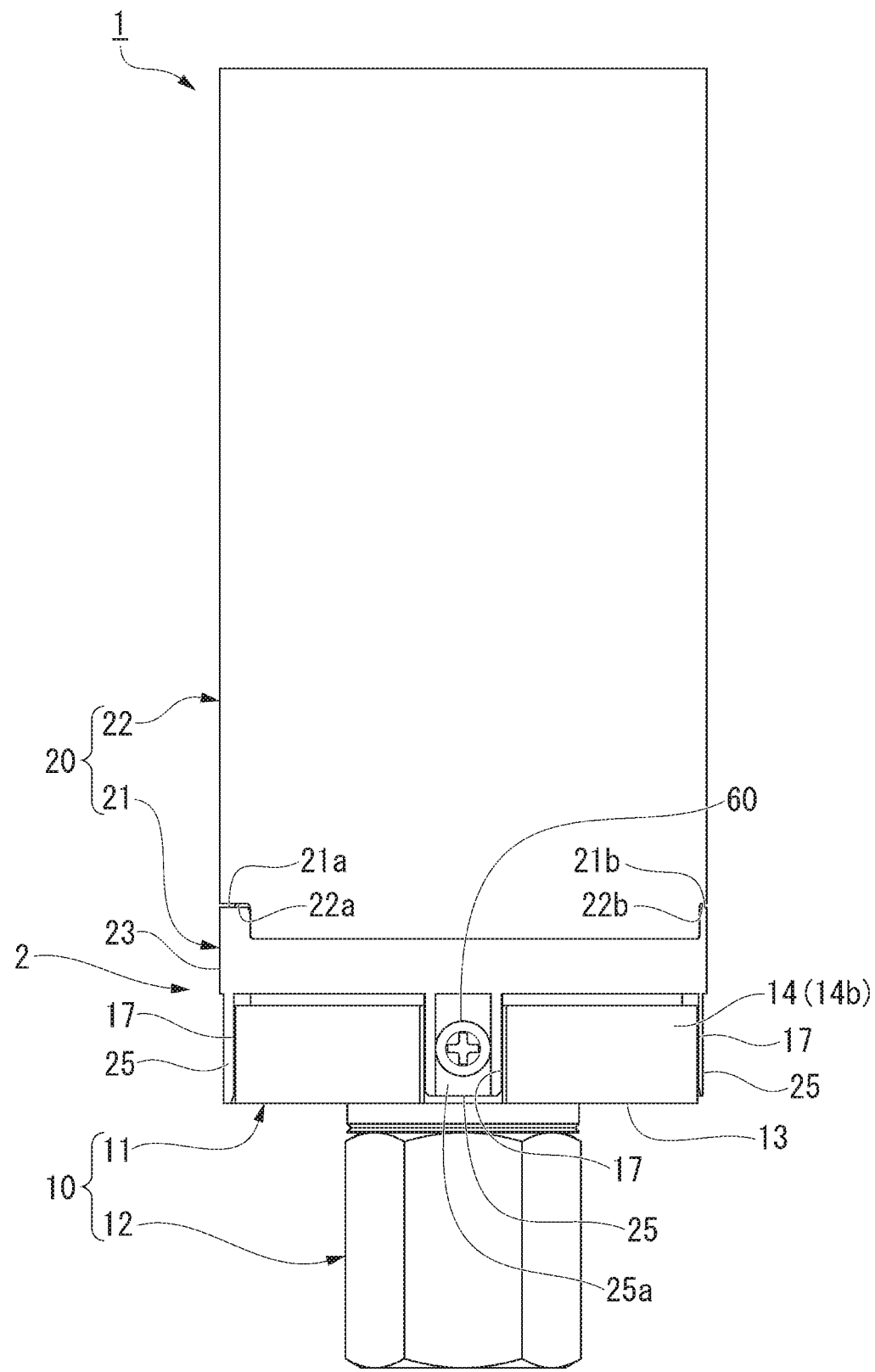
FIG. 1 is a front view of a measuring instrument in an embodiment of the present invention.
Figure 2:
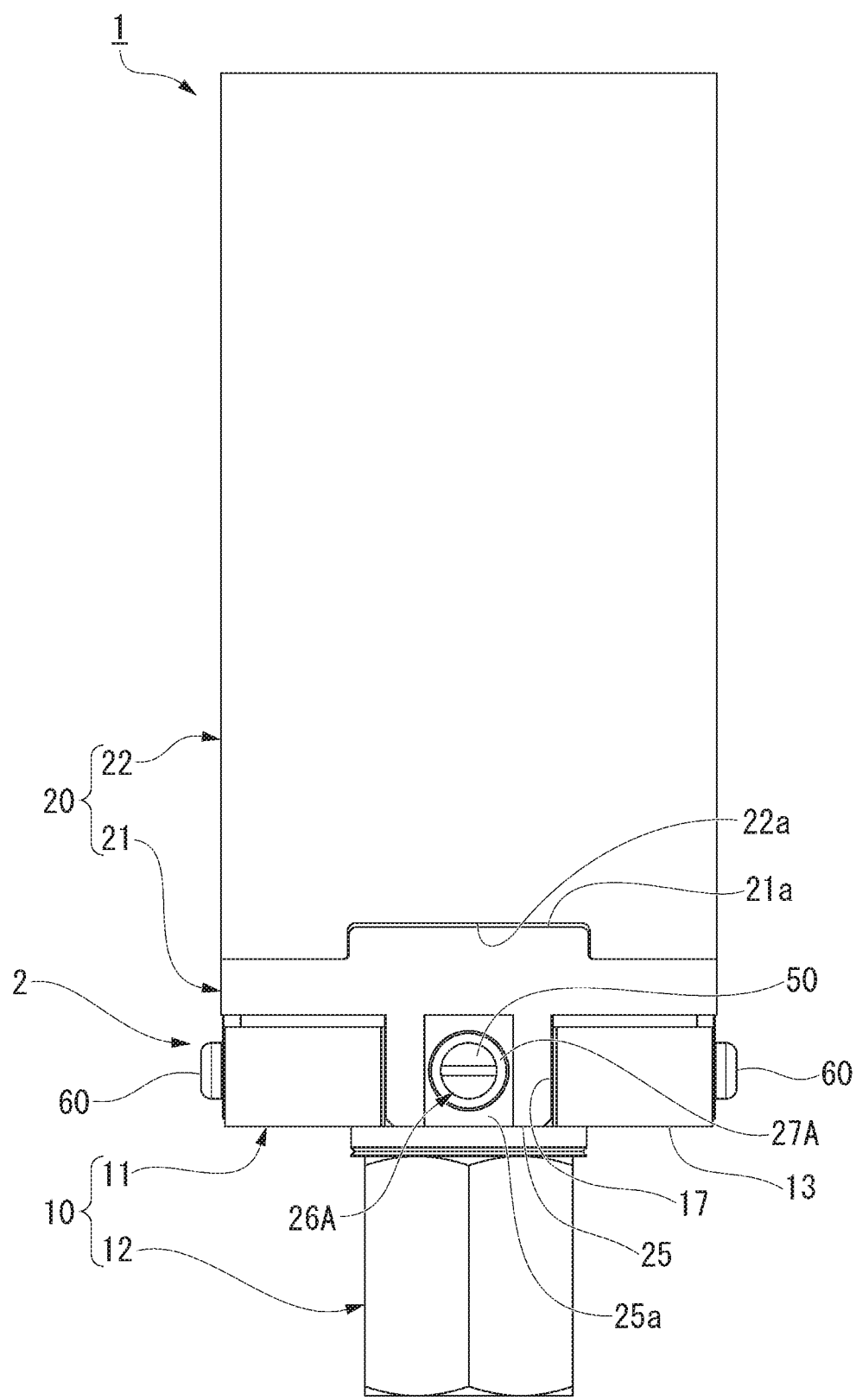
FIG. 2 is a left side view of the measuring instrument illustrated in FIG. 1.
Figure 3:
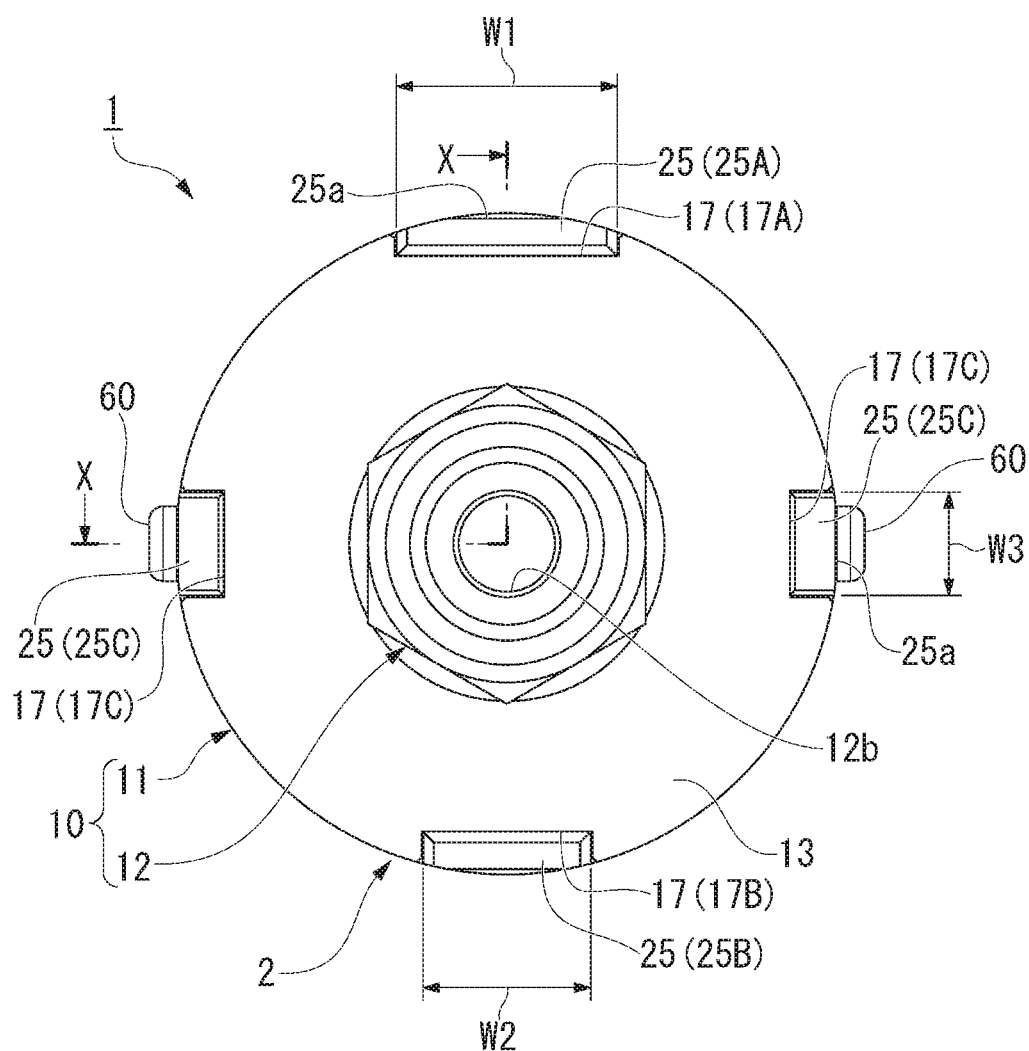
FIG. 3 is a bottom view of the measuring instrument illustrated in FIG. 2.
Figure 4:
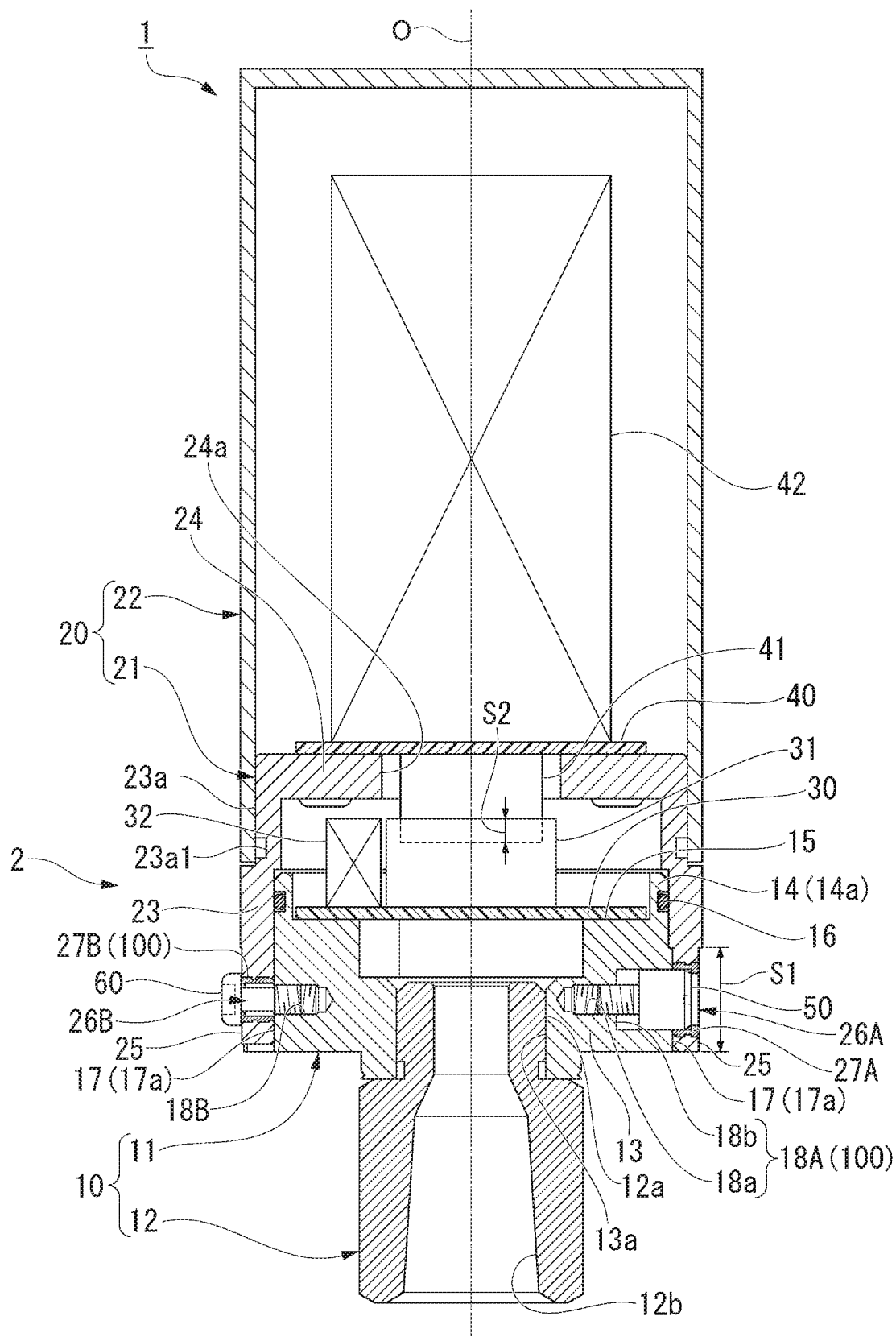
FIG. 4 is a sectional view of the measuring instrument illustrated in FIG. 3 in a direction of arrows X and X.
Figure 5:
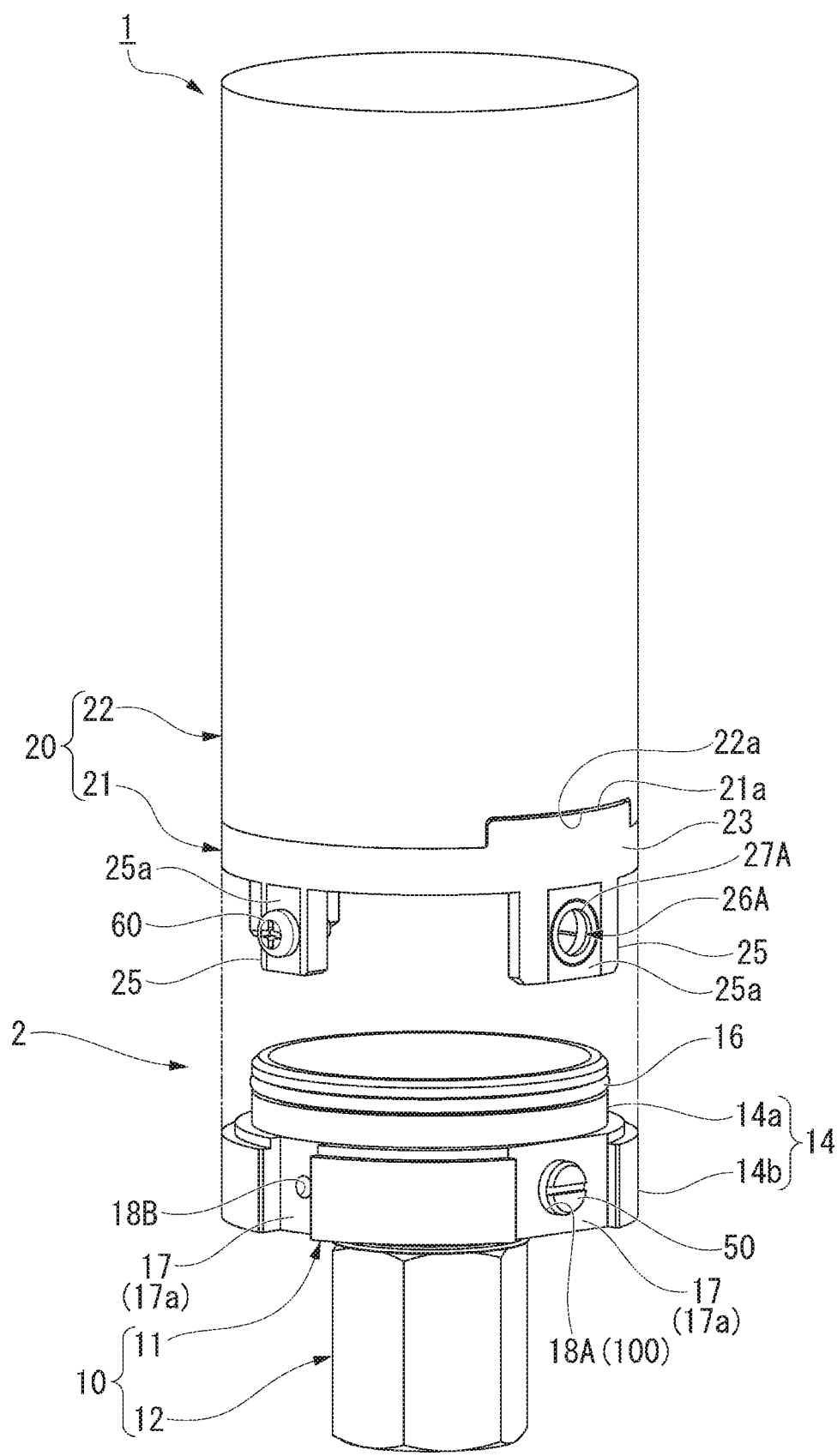
FIG. 5 is an exploded perspective view of the measuring instrument illustrated in FIG. 1.

FIG. 1 is a front view of a measuring instrument 1 in an embodiment of the present invention. FIG. 2 is a left side view of the measuring instrument 1 illustrated in FIG. 1. FIG. 3 is a bottom view of the measuring instrument 1 illustrated in FIG. 2. FIG. 4 is a sectional view of the measuring instrument 1 illustrated in FIG. 3 in a direction of arrows X and X. FIG. 5 is an exploded perspective view of the measuring instrument 1 illustrated in FIG. 1.

As illustrated in these figures, the measuring instrument 1 includes a module connection structure 2 that connects a first module 10 and a second module 20.

As illustrated in FIG. 4, the first module 10 includes a bottomed tubular first housing 11 and a tubular adapter 12 connected to a bottom 13 of the first housing 11. Further, the second module 20 includes a topped tubular second housing 21 and a topped tubular cover 22 fitted into a top of the second housing 21.

Central axes O of the first housing 11, the adapter 12, the second housing 21, and the cover 22 are common to one another. In the following description, a direction in which the central axis O extends is referred to as an axial direction, a direction perpendicular to the central axis O is referred to as a radial direction, and a direction circulating around the central axis O is referred to as a circumferential direction.

The first housing 11 is formed of, for example, a metal material. As illustrated in FIG. 4, the first housing 11 includes the bottom 13 having a disc shape, a first circumferential wall 14 that is raised from a circumferential edge of the bottom 13, and a step 15 that is formed between the bottom 13 and the first circumferential wall 14. A screw hole 13a for mounting the adapter 12 is provided in the center of the bottom 13. The step 15 is raised from an upper surface of the bottom 13 outside the screw hole 13a in the radial direction, and horizontally extends up to an inner wall surface of the first circumferential wall 14. A first substrate 30 is fixed to an upper surface of the step 15.

A connector 31 for substrate-to-substrate connection (board-to-board connection) is connected to the first substrate 30. Further, a sensor 32 is connected to the first substrate 30. The sensor 32 measures physical parameters of a mounting object or a measuring target (not illustrated) of the first module 10, and thus is used as a pressure sensor that measures a pressure of the mounting object or the measuring target in the present embodiment. The sensor 32 may be a sensor that measures a pressure as well as various physical parameters such as, for example, a flow rate, a temperature, a humidity, a speed, an acceleration, a rotational frequency, vibration, and so on. The sensor 32 may be installed outside the measuring instrument 1 instead of being mounted on the first substrate 30. In that case, the sensor 32 may be connected to, for example, terminals (not illustrated) of the measuring instrument 1 via a cable or a connector from the sensor 32 installed outside, and connected to the first substrate 30 from, for example, the terminals.

The adapter 12 is formed of, for example, a metal material. The adapter 12 has a threaded part 12a screwed into the screw hole 13a of the first housing 11. Further, the adapter 12 has a through-hole 12b that passes therethrough along the central axis O in the axial direction. The through-hole 12b communicates with an inner side of the first housing 11. Thus, the inner and outer sides of the first housing 11 are made uniform in pressure via the adapter 12, and the sensor 32 can measure a pressure of the outer side of the first housing 11. Further, a fluid to be measured, a pressure of which will be measured, may be introduced into the sensor 32 via the adapter 12, and the pressure of the fluid to be measured may be measured by the sensor 32.

As illustrated in FIG. 5, the first circumferential wall 14 of the first housing 11 includes a reduced diameter part 14a that is inserted into the second housing 21 and an enlarged diameter part 14b that is continuously provided on a lower side of the reduced diameter part 14a and has a larger diameter than the reduced diameter part 14a. An annular groove in which a seal ring (an O-ring) 16 is disposed is provided in an outer circumferential surface of the reduced diameter part 14a in the circumferential direction. On the other hand, a plurality of fitting recesses 17 that extend in the axial direction are provided in an outer circumferential surface of the enlarged diameter part 14b at intervals in the circumferential direction.

Next, the second module 20 will be described. The second housing 21 of the second module 20 is formed of, for example, a resin material. As illustrated in FIG. 4, the second housing 21 includes a second circumferential wall 23 that is fitted around the first circumferential wall 14 of the first housing 11 and a top wall 24 that is continuously provided on an upper end of the second circumferential wall 23. The reduced diameter part 23a, a diameter of which is slightly reduced, is provided above a fitted position of the second circumferential wall 23 with the first circumferential wall 14, and is fitted into the cover 22 formed of a resin material.

An annular groove 23a1 is provided in a lower end of the reduced diameter part 23a in the circumferential direction. The annular groove 23a1 moderately reduces a contact area between the reduced diameter part 23a and the cover 22, and increases a contact pressure between the parts to improve a degree of airtightness. A second substrate 40 is fixed to an upper surface of the top wall 24. A connector 41 for substrate-to-substrate connection (board-to-board connection) that forms a pair with the connector 31 is connected to the second substrate 40. The connector 41 is connected with the connector 31 of the first module 10 via a through-hole 24a provided in the top wall 24.

An electronic unit 42 is connected to the second substrate 40. The electronic unit 42 is made up of a power supply unit, a wireless communication unit, or the like. The power supply unit includes a battery (not illustrated), and supplies power to the sensor 32 or the wireless communication unit of the electronic unit 42. The wireless communication unit transmits, for example, measured results (sensor data) of the sensor 32 to the outside of the cover 22, and includes, for example, an antenna for telecommunication which transmits the sensor data via a wireless network (not illustrated).

Further, the wireless communication unit may include an antenna for near field communication (NFC) which performs provisioning required to cause the measuring instrument 1 to participate in the wireless network through wireless communication. Here, NFC refers to communication (wireless communication) that is possible, for example, in a case where a distance between communicating devices is less than or equal to tens of centimeters, and also includes communication that is performed in a state in which housings of the communicating devices are in contact with each other. In NFC, power can be wirelessly supplied from one of two devices that communicate with each other to the other device. The measuring instrument 1 in which NFC is possible can communicate with an information terminal device such as a smartphone, a tablet type computer, a notebook type computer, etc. that can perform NFC.

Referring back to FIG. 5, a plurality of fitting protrusions 25, which are inserted into the plurality of fitting recesses 17 provided in the first housing 11 in the axial direction, are projected downward at a lower end of the second circumferential wall 23 of the second housing 21. An inserting direction of the fitting protrusions 25 into the fitting recesses 17 and connecting directions of the connectors 31 and 41 illustrated in FIG. 4 are in common with each other in the axial direction. The plurality of fitting protrusions 25 are provided in the same number and phase as the plurality of fitting recesses 17. In the present embodiment, four fitting protrusions 25 are provided like the fitting recesses 17, and are provided at intervals of 90° in the circumferential direction (see FIG. 3).

As illustrated in FIG. 4, a fitting length S1 of the fitting protrusions 25 and the fitting recesses 17 in the axial direction is longer than a fitting length S2 of the connectors 31 and 41 in the axial direction. For this reason, when the second module 20 is assembled to the first module 10, this assembly has a dimensional relation in which the fitting protrusions 25 are inserted into the fitting recesses 17 first, and connection by the connectors 31 and 41 is initiated while the fitting protrusions 25 are being fitted into the fitting recesses 17. Here, the fitting length is a length by which the fitting protrusions 25 and the fitting recesses 17 overlap each other in the axial direction in terms of the fitting protrusions 25 and the fitting recesses 17, and is a length by which the connector 41 is inserted into the connector 31 in the axial direction in terms of the connectors 31 and 41.

As illustrated in FIG. 3, the fitting protrusions 25 include a first fitting protrusion 25A having a first fitting width W1, a second fitting protrusion 25B having a second fitting width W2, and two third fitting protrusions 25C having a third fitting width W3. In the same way, the fitting recesses 17 also include a first fitting recess 17A having the first fitting width W1, a second fitting recess 17B having the second fitting width W2, and two third fitting recesses 17C having the third fitting width W3.

Here, the fitting width is a distance from one of opposite side end faces of each fitting protrusion 25 in the circumferential direction to the other side end face in terms of the fitting protrusions 25, and is a distance from one of opposite sidewall surfaces of each fitting recess 17 in the circumferential direction to the other sidewall surface in terms of the fitting recesses 17. The first fitting width W1, the second fitting width W2, and the third fitting width W3 are different from one another. In the present embodiment, the first fitting width W1 is largest, and the second fitting width W2 is second largest. The smallest width is the third fitting width W3.

For this reason, the first fitting protrusion 25A can only be inserted into the first fitting recess 17A. Therefore, a mounting direction of the second module 20 with respect to the first module 10 is easily understood, and it is possible to prevent the second module 20 from being mounted on the first module 10 in a direction reversed left and right. Since movable fixing pins (fixing members) 50 (to be described below) are inserted into the first and second fitting protrusions 25A and 25B, the first and second fitting protrusions 25A and 25B have a larger fitting width than the third fitting protrusions 25C. Incidentally, fastening screws (fixing members) 60 (to be described below) are inserted into the third fitting protrusions 25C.

Plane parts 25a, which improve sitting (contact) of the fastening screws 60, are formed on outer circumferential surfaces of the third fitting protrusions 25C. Further, in addition to the third fitting protrusions 25C, plane parts 25a are also formed on outer circumferential surfaces of all the fitting protrusions 25. By forming the plane parts 25a, drilling for forming holes into which the movable fixing pins 50 and the fastening screws 60 (to be described below) are inserted is facilitated. Incidentally, if the fitting widths of the third fitting protrusions 25C are different from those of the first and second fitting protrusions 25A and 25B even if the third fitting protrusions 25C are in common with the first fitting protrusion 25A or the second fitting protrusion 25B, the aforementioned operation and effects (of preventing erroneous mounting) can be obtained.

As illustrated in FIGS. 1 and 2, a fitting protrusion 21a and a fitting recess 22a, and a fitting protrusion 21b and a fitting recess 22b are also provided on the second housing 21 and in the cover 22. The fitting protrusion 21a and the fitting recess 22a, and the fitting protrusion 21b and the fitting recess 22b have fitting widths different from each other, and thus a mounting direction of the cover 22 with respect to the second housing 21 is configured to be easily understood.

As illustrated in FIG. 4, the first module 10 has first screw holes 18A that are provided in fitting surfaces 17a of the fitting recesses 17 and act as fixing member holders 100. The movable fixing pins (the fixing members) 50 are screwed into the first screw holes 18A. The fitting surfaces 17a are bottom wall surfaces, each of which is connected between one sidewall surface and the other sidewall surface of each fitting recess 17 which face each other in the circumferential direction.

Figure 6:
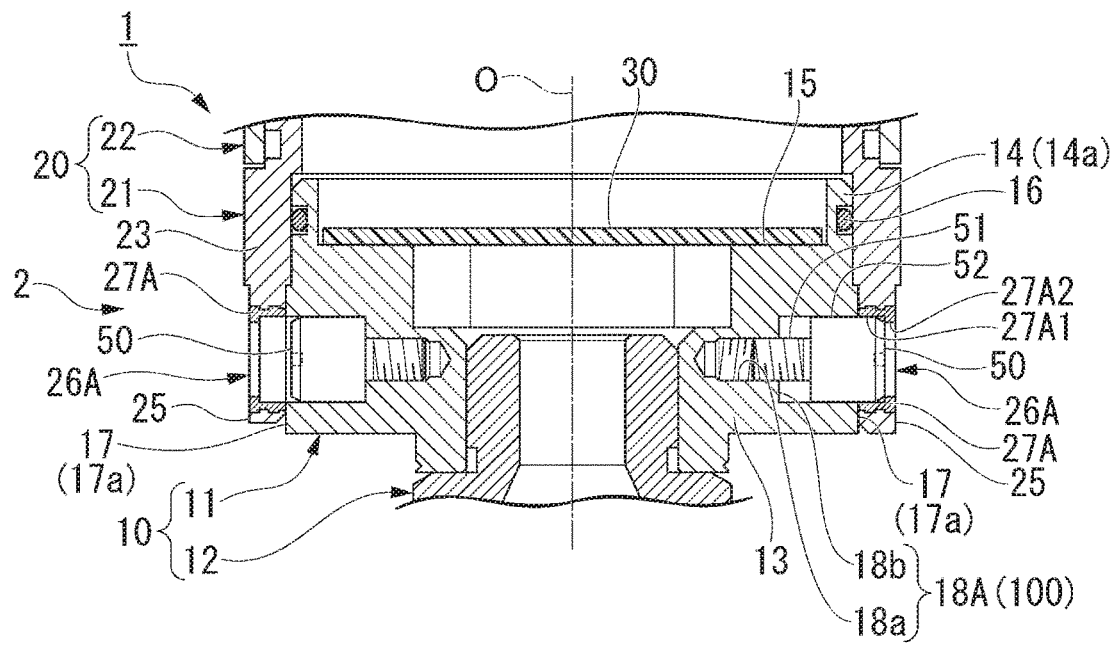
FIG. 6 is an enlarged view illustrating constitutions around movable fixing pins of the measuring instrument illustrated in FIG. 4.

FIG. 6 is an enlarged view illustrating constitutions around the movable fixing pins 50 of the measuring instrument 1 illustrated in FIG. 4. Unlike FIG. 4, the movable fixing pins 50 are illustrated on both right and left sides in FIG. 6.

The movable fixing pins 50 are provided to be movable between a fixed position at which the second module 20 cannot be separated from the first module 10 as illustrated on the right side in FIG. 6 and an unfixed position at which the second module 20 can be separated from the first module 10 as illustrated on the left side in FIG. 6. In this way, the movable fixing pins 50 are provided to be movable between the fixed position and the unfixed position in the radial direction perpendicular to the axial direction in which the central axis O extends.

Each movable fixing pin 50 includes a male threaded part 51 and a head 52 that has a larger diameter than the male threaded part 51. On the other hand, each first screw hole 18A provided in the first module 10 includes a female threaded part 18a into which the male threaded part 51 is screwed and a countersink 18b in which the head 52 is housed. A depth of the countersink 18b in the radial direction is larger than a length of the head 52. For this reason, the movable fixing pins 50 are provided to be movable between the fixed position at which they protrude from the fitting surfaces 17a (on the right side in FIG. 6) and the unfixed position at which they do not protrude from the fitting surfaces 17a (are retracted (embedded) inside the fitting surfaces 17a in the radial direction (on the left side in FIG. 6)).

The second module 20 includes first insertion holes 26A which are provided in the fitting protrusions 25 and into which the movable fixing pins 50 located at the fixed position illustrated on the right side in FIG. 6 are inserted, and first restraints 27A that are provided in the first insertion holes 26A and restrain the movable fixing pins 50 from falling from the first screw holes 18A. The first restraints 27A are formed of, for example, a tubular metal material fitted to the fitting protrusions 25 of the second housing 21 formed of a resin material.

Each first restraint 27A includes an insertion tubular part 27A1 that has an inner diameter larger than or equal to an outer diameter of the head 52 of each movable fixing pin 50 and a throttle part 27A2 that is disposed at an outer end of the insertion tubular part 27A1 in the radial direction and has an inner diameter smaller than the outer diameter of the head 52. The throttle part 27A2 faces the head 52 in the radial direction, and restrains outward movement of each movable fixing pin 50 in the radial direction. Thus, screwed states of the movable fixing pins 50 into the first screw holes 18A can be secured at the fixed position at which they protrude from the fitting recesses 17, and can prevent the movable fixing pins 50 from falling from the first module 10.

Referring back to FIG. 4, the second module 20 is also fixed to the first module 10 by the fastening screws (the fixing members) 60 aside from the movable fixing pins 50. The fastening screws 60 are screwed into second screw holes 18B provided in the fitting recesses 17 of the first module 10.

Figure 7:
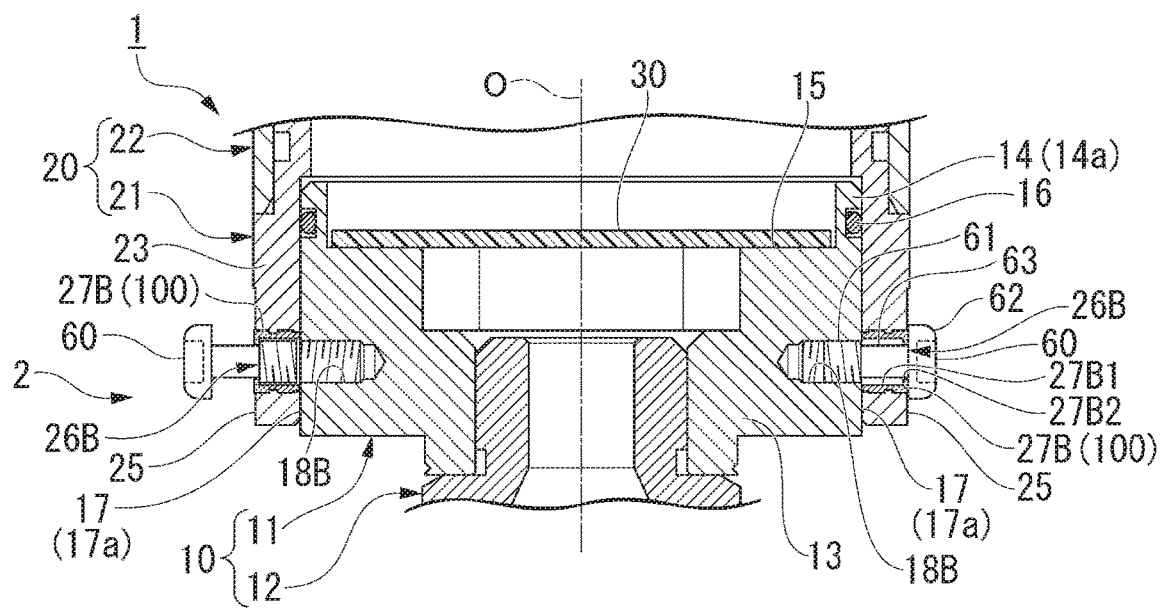
FIG. 7 is an enlarged view illustrating constitutions around fastening screws of the measuring instrument illustrated in FIG. 4.

FIG. 7 is an enlarged view illustrating constitutions around the fastening screws 60 of the measuring instrument 1 illustrated in FIG. 4. Unlike FIG. 4, the fastening screws 60 are illustrated on both right and left sides in FIG. 7.

The fastening screws 60 are provided to be movable between a fixed position at which the second module 20 cannot be separated from the first module 10 as illustrated on the right side in FIG. 7 and an unfixed position at which the second module 20 can be separated from the first module 10 as illustrated on the left side in FIG. 7. In this way, the fastening screws 60 are provided to be movable between the fixed position and the unfixed position in the radial direction perpendicular to the axial direction in which the central axis O extends.

Each fastening screw 60 includes a male threaded part 61, a head 62 that has a larger diameter than the male threaded part 61, and a shank 63 that has a smaller diameter than the male threaded part 61. The shank 63 is provided between the male threaded part 61 and the head 62, and forms a constriction at each fastening screw 60. The second module 20 includes second insertion holes 26B that are provided in the fitting protrusions 25 and second restraints 27B (fixing member holders 100) that restrain the fastening screws 60 located at the unfixed position from falling from the second insertion holes 26B. The second restraints 27B are formed of, for example, a tubular metal material fitted to the fitting protrusions 25 of the second housing 21 formed of a resin material.

Each second restraint 27B includes an insertion tubular part 27B1 that has an inner diameter larger than or equal to an outer diameter of the male threaded part 61 of each fastening screw 60 and a throttle part 27B2 that is disposed at an outer end of the insertion tubular part 27B1 in the radial direction and has an inner diameter that is smaller than the outer diameter of the male threaded part 61 and is larger than or equal to an outer diameter of the shank 63. A length of the insertion tubular part 27B1 in the radial direction is larger than that of the male threaded part 61. For this reason, the fastening screws 60 are configured to be movable between the fixed position at which they are screwed into the second screw holes 18B (on the right side in FIG. 7) and the unfixed position at which they are unscrewed from the second screw holes 18B (on the left side in FIG. 7).

The throttle part 27B2 faces the male threaded part 61 in the radial direction, and restrains outward movement of each fastening screw 60 in the radial direction. Further, since the throttle part 27B2 also faces the head 62 in the radial direction, the throttle part 27B2 can also restrain inward movement of each fastening screw 60 in the radial direction. Thus, the fastening screws 60 can be held in the second insertion holes 26B even at the unfixed position at which they are unscrewed from the second screw holes 18B and which is illustrated on the left side in FIG. 7, and the fastening screws 60 can be prevented from falling from the second module 20.

Figure 8:
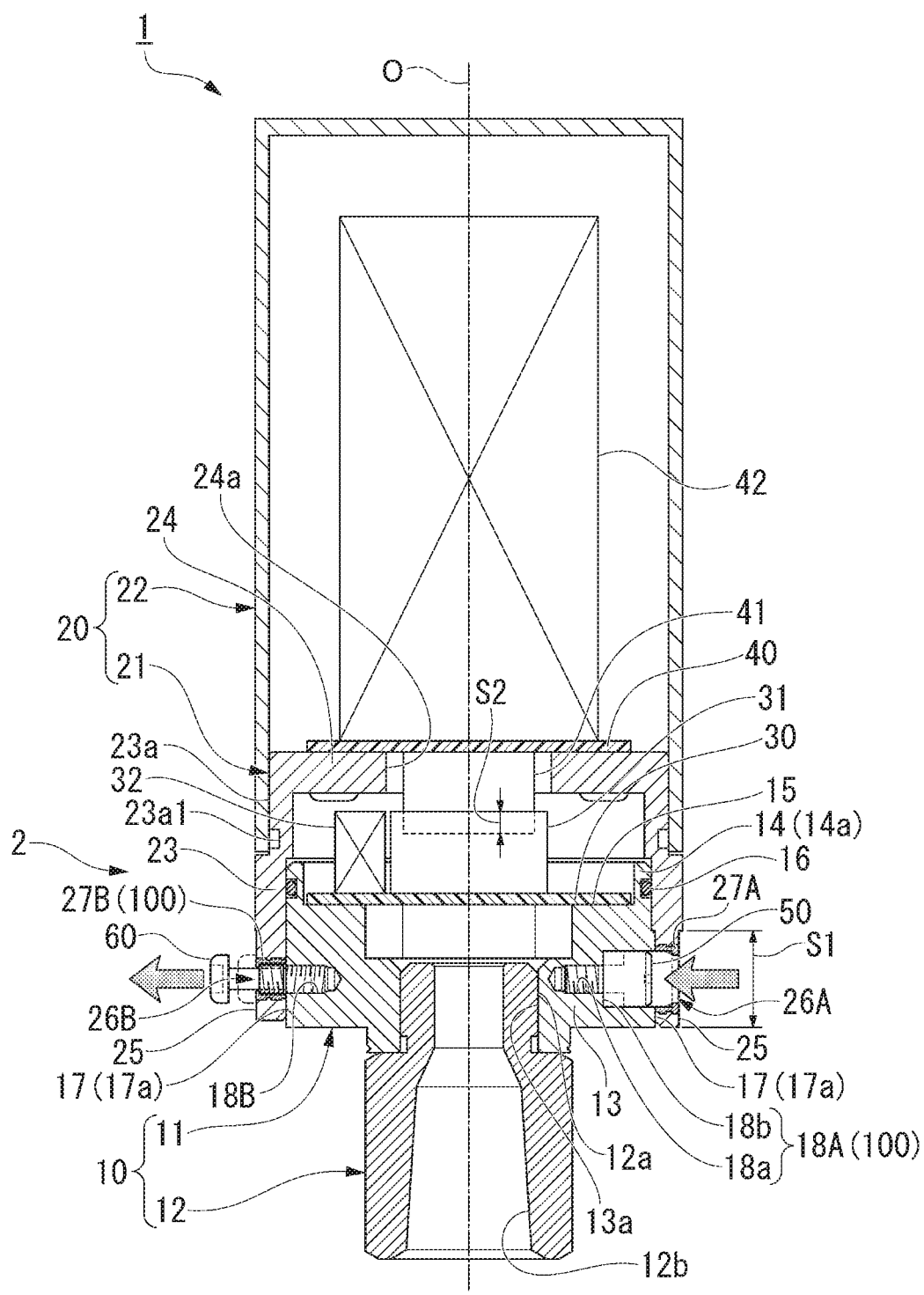
FIG. 8 is an explanatory view illustrating a state in which a second module is demounted from a first module in accordance with the embodiment of the present invention.
Figure 9:
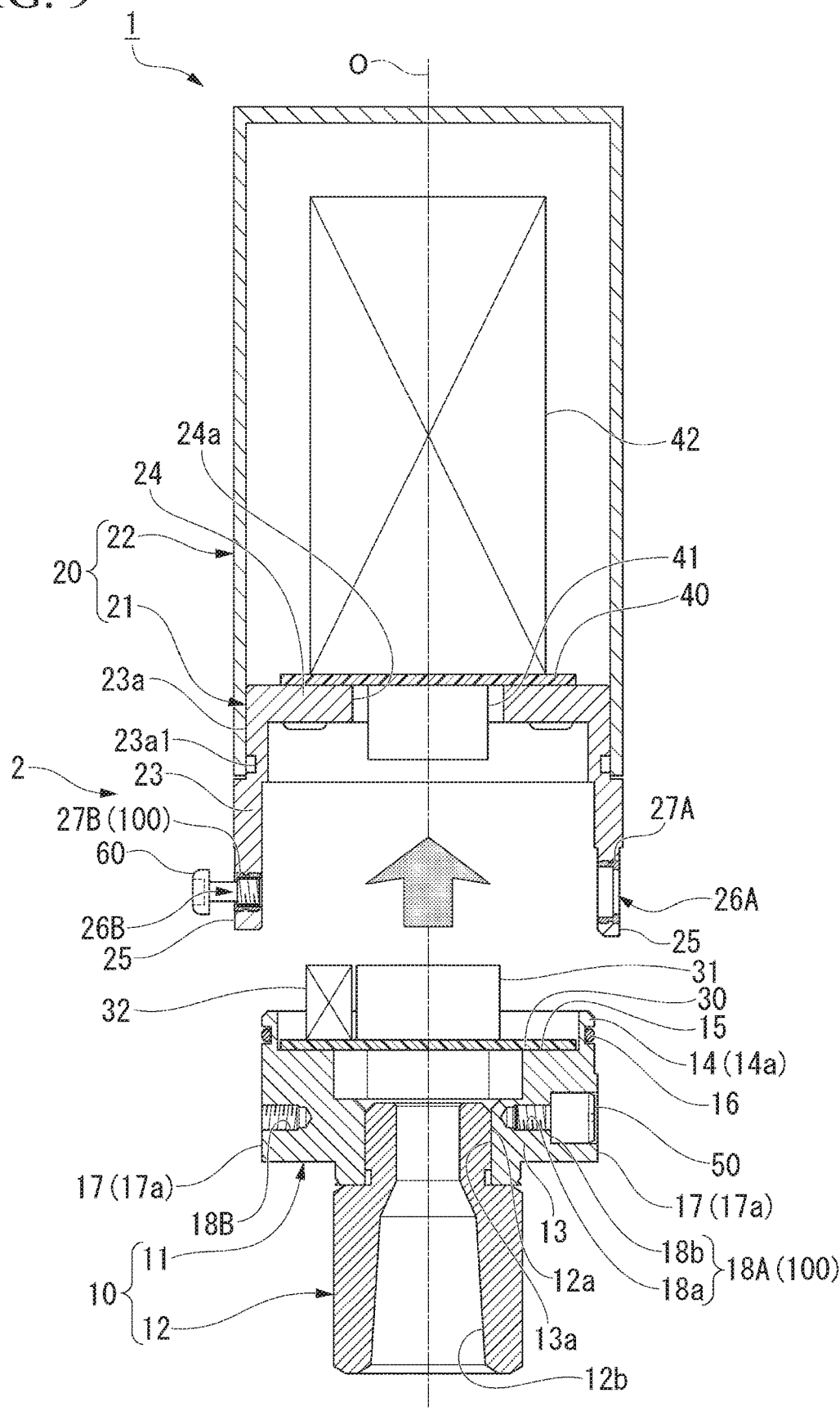
FIG. 9 is an explanatory view illustrating a state in which the second module is demounted from the first module in accordance with the embodiment of the present invention.

FIGS. 8 and 9 are explanatory views illustrating a state in which the second module 20 is demounted from the first module 10 in accordance with an embodiment of the present invention.

In the case where the second module 20 is demounted, the fixing members (the movable fixing pins 50 and the fastening screws 60) that fix the second module 20 to the first module 10 as illustrated in FIG. 8 are moved from the fixed position to the unfixed position first.

To move the movable fixing pins 50 to the unfixed position, a screwdriver is inserted into a slit of each head 52 (a minus groove, though it may be a plus groove) via each first insertion hole 26A, and each movable fixing pin 50 is turned so that each movable fixing pin 50 is moved inward in the radial direction to be embedded inside the fitting surface 17*a* of each fitting recess 17 in the radial direction. Thus, the heads 52 of the movable fixing pins 50 come out of the first insertion holes 26A provided in the fitting protrusions 25. That is, the movable fixing pins 50 have a positional relation in which they do not face the first insertion holes 26A in the axial direction.

Further, to move the fastening screws 60 to the unfixed position, a screwdriver is inserted into a slit of each head 62 (a minus groove, though it may be a plus groove), and each fastening screw 60 is turned so that each fastening screw 60 is moved outward in the radial direction. Thus, the male threaded parts 61 of the fastening screws 60 come out of the second screw holes 18B provided in the first module 10. That is, the fastening screws 60 are unscrewed from the second screw holes 18B.

Next, as illustrated in FIG. 9, the second module 20 is pulled out of the first module 10 in the axial direction. Thus, the connection between the connectors 31 and 41 can be released, and the second module 20 can be demounted from the first module 10. Here, the movable fixing pins 50 moved to the unfixed position are held in the first module 10 by the first screw holes 18A (the fixing member holders 100). Further, the fastening screws 60 moved to the unfixed position are held in the second module 20 by the second restraints 27B (the fixing member holders 100).

That is, the movable fixing pins 50 are formed to be incorporated into the first module 10, and are prevented from falling from the first module 10. Further, the fastening screws 60 are formed to be incorporated into the second module 20, and are prevented from falling from the second module 20. Therefore, a risk of the movable fixing pins 50 falling from the first module 10 and the fastening screws 60 falling from the second module 20 can be removed, and a loss of the fixing members can be prevented.

In a case where the second module 20 is mounted on the first module 10, the mounting follows a reverse procedure. When the movable fixing pins 50 are inserted into the first insertion holes 26A of the fitting protrusions 25, the second module 20 is positioned with respect to the first module 10 in the axial direction and the circumferential direction. Further, when the fastening screws 60 are screwed into the second screw holes 18B of the first module 10, the second module 20 is positioned with respect to the first module 10 in the radial direction, and vibration (rattling) of the second module 20 against the first module 10 around an axis passing through the two movable fixing pins 50 is prevented. For this reason, reliability of the connection between the connectors can be maintained.

In this way, the module connection structure 2 of the present embodiment described above adopts a constitution that includes the first module 10, the second module 20 that is connected to the first module 10 via the connectors 31 and 41, and the fixing members (the movable fixing pins 50 and the fastening screws 60) that fix the second module 20 to the first module 10, wherein the fixing members (the movable fixing pins 50 and the fastening screws 60) are provided to be movable between the fixed position at which the second module 20 cannot be separated from the first module 10 and the unfixed position at which the second module 20 can be separated from the first module 10, and the first module 10 and the second module 20 have the fixing member holders 100 that hold the fixing members (the movable fixing pins 50 and the fastening screws 60) located at least at the unfixed position. Thereby, the falling of the fixing members (the movable fixing pins 50 and the fastening screws 60) that fix the first module 10 and the second module 20 can be prevented. Further, the reliability (to be specific, connection strength) of the connection between the connectors of the first module 10 and the second module 20 can be maintained.

Further, in the present embodiment, as illustrated in FIG. 5, the first module 10 has the plurality of fitting recesses 17 that extend in the connecting direction of the connectors 31 and 41 (the axial direction), and the second module 20 has the plurality of fitting protrusions 25 that are inserted into the plurality of fitting recesses 17 in the connecting direction of the connectors 31 and 41.

According to this constitution, since the connecting direction of the connectors 31 and 41 is the same as the inserting direction of the fitting protrusions 25 into the fitting recesses 17, the connectors 31 and 41 can be accurately connected while guiding the plurality of fitting protrusions 25 through the plurality of fitting recesses 17.

Further, in the present embodiment, as illustrated in FIG. 4, the first module 10 includes: the first screw holes 18A that are provided in the fitting surfaces 17a of the fitting recesses 17 and act as the fixing member holders 100; and the movable fixing pins 50 that act as the fixing members, are screwed into the first screw holes 18A, and are movable between the fixed position at which they protrude from the fitting surfaces 17a and the unfixed position at which they do not protrude from the fitting surfaces 17a, and the second module 20 has the first insertion holes 26A which are provided in the fitting protrusions 25 and into which the movable fixing pins 50 located at the fixed position are inserted.

According to this constitution, the movable fixing pins 50 becoming the fixing members are screwed into the first screw holes 18A that act as the fixing member holders 100 and are provided in the fitting recesses 17, and are held in the first module 10. As illustrated in FIG. 8, when the movable fixing pins 50 are moved to the unfixed position, the movable fixing pins 50 are retracted into the fitting recesses 17 and enter the first module 10, and thus the falling of the movable fixing pins 50 is prevented. Further, as illustrated in FIG. 4, when the movable fixing pins 50 are moved to the fixed position, the movable fixing pins 50 are inserted into the first insertion holes 26A provided in the fitting protrusions 25 of the second module 20, and prevent coming-off of the second module 20 (the fitting protrusions 25) from the first module 10 (the fitting recesses 17). Thus, the reliability of the connection between the connectors can be maintained.

Further, in the present embodiment, as illustrated in FIG. 4, the second module 20 has the first restraints 27A that are provided in the first insertion holes 26A and restrain the movable fixing pins 50 from falling from the first screw holes 18A.

According to this constitution, the first restraints 27A, which restrain the falling from the first screw holes 18A of the movable fixing pins 50, are provided in the first insertion holes 26A, and the falling of the movable fixing pins 50 protruding from the fitting surfaces 17a can be prevented.

Further, in the present embodiment, the first module 10 has the first and second fitting recesses 17A and 17B as the fitting recesses 17 in which the first screw holes 18A are provided as illustrated in FIG. 3, and the second module 20 has the first fitting protrusions 25A inserted into the first fitting recesses 17A and the second fitting protrusions 25B inserted into the second fitting recesses 17B as the fitting protrusions 25 in which the first insertion holes 26A are provided. The fitting widths W1 of the first fitting recesses 17A and the first fitting protrusions 25A are different from the fitting widths W2 of the second fitting recesses 17B and the second fitting protrusions 25B.

According to this constitution, since fitting between the first fitting recesses 17A and the second fitting protrusions 25B and fitting between the second fitting recesses 17B and the first fitting protrusions 25A are not possible, the mounting direction of the second module 20 on the first module 10 is easily understood, and the second module 20 can be prevented from being mounted on the first module 10 in a reverse direction. Damage to the connectors 31 and 41 can be prevented without an excessive force being applied to the connectors 31 and 41.

Further, in the present embodiment, as illustrated in FIG. 4, the first module 10 has the second screw holes 18B that are provided in the fitting recesses 17, and the second module 20 has the second insertion holes 26B that are provided in the fitting protrusions 25, and the fastening screws 60 that act as the fixing members, are inserted into the second insertion holes 26B, and are movable between the fixed position at which they are screwed into the second screw holes 18B and the unfixed position at which they are not screwed into the second screw holes 18B. As illustrated in FIG. 8, the second module 20 has the second restraints 27B that act as the fixing member holders 100 and restrain the fastening screws 60 located at the unfixed position from falling from the second insertion holes 26B.

According to this constitution, as illustrated in FIG. 4, the fastening screws 60 becoming the fixing members pass through the second insertion holes 26B provided in the fitting protrusions 25 of the second module 20, and are screwed into the second screw holes 18B provided in the fitting recesses 17 of the first module 10, and thereby the second module 20 is fixed to the first module 10. The second restraints 27B acting as the fixing member holders 100 are provided in the second insertion holes 26B, and the fastening screws 60 are held in the second module 20 by the second restraints 27B. When the fastening screws 60 are moved to the unfixed position, the fastening screws 60 are restrained from falling from the second insertion holes 26B by the second restraints 27B as illustrated in FIG. 8, and thus the loss of the fastening screws 60 can be prevented.

Further, the present embodiment has a dimensional relation in which the fitting protrusions 25 are inserted into the fitting recesses 17, and the connection by the connectors 31 and 41 is initiated while the fitting protrusions 25 are being fitted into the fitting recesses 17.

According to this constitution, since the fitting protrusions 25 are inserted into the fitting recesses 17, and the connection by the connectors 31 and 41 is initiated in a state in which the second module 20 is positioned to the first module 10, and thus the connectors 31 and 41 can be accurately connected.

Further, in the present embodiment, the fixing members (the movable fixing pins 50 and the fastening screws 60) are provided to be movable between the fixed position and the unfixed position in the orthogonal direction (the radial direction) perpendicular to the connecting direction of the connectors 31 and 41.

According to this constitution, each of the first module 10 and the second module 20 is provided with, for example, a flange spread out in the radial direction, and there is no need to butt and fix the flanges in the connecting direction (the axial direction) of the connectors 31 and 41. Thus, a size in the axial direction can be reduced.

Further, in the present embodiment, as illustrated in FIGS. 4 and 5, the first module 10 has the seal ring 16 that seals a gap between the first module 10 and the second module 20.

According to this constitution, the gap between the first module 10 and the second module 20 is sealed by the seal ring 16, and intrusion of a liquid into an interior of the measuring instrument 1 from the gap between the first module 10 and the second module 20 can be obstructed. Thus, a waterproof structure suitable for use in a field area can be established.

Further, in the measuring instrument 1 of the present embodiment, the measuring instrument 1 includes the first module 10 with the first substrate 30 connected to the sensor 32 and the second module 20 that includes the second substrate 40 connected to the first substrate 30 via the connectors 31 and 41 and is connected to be separable with respect to the first module 10, and has the module connection structure 2 described in advance as the module connection structure between the first module 10 and the second module 20.

According to this constitution, in the measuring instrument 1 in which the first substrate 30 inside the first module 10 and the second substrate 40 inside the second module 20 are connected by the connectors 31 and 41 for substrate-to-substrate connection, the falling of the fixing members (the movable fixing pins 50 and the fastening screws 60) can be prevented. Thus, for example, the measuring instrument 1 suitable for installation of an explosion-proof area is obtained. Further, the reliability of the connection between the connectors of the first module 10 and the second module 20 can be maintained.

While the preferred embodiment of the present invention has been described with reference to the drawings, it goes without saying that the present invention is not limited to the above embodiment. All the shapes and combinations of the components shown in the aforementioned embodiment are only examples and can be variously modified based on design requirements without departing from the spirit and scope of the present invention.

Figure 10:
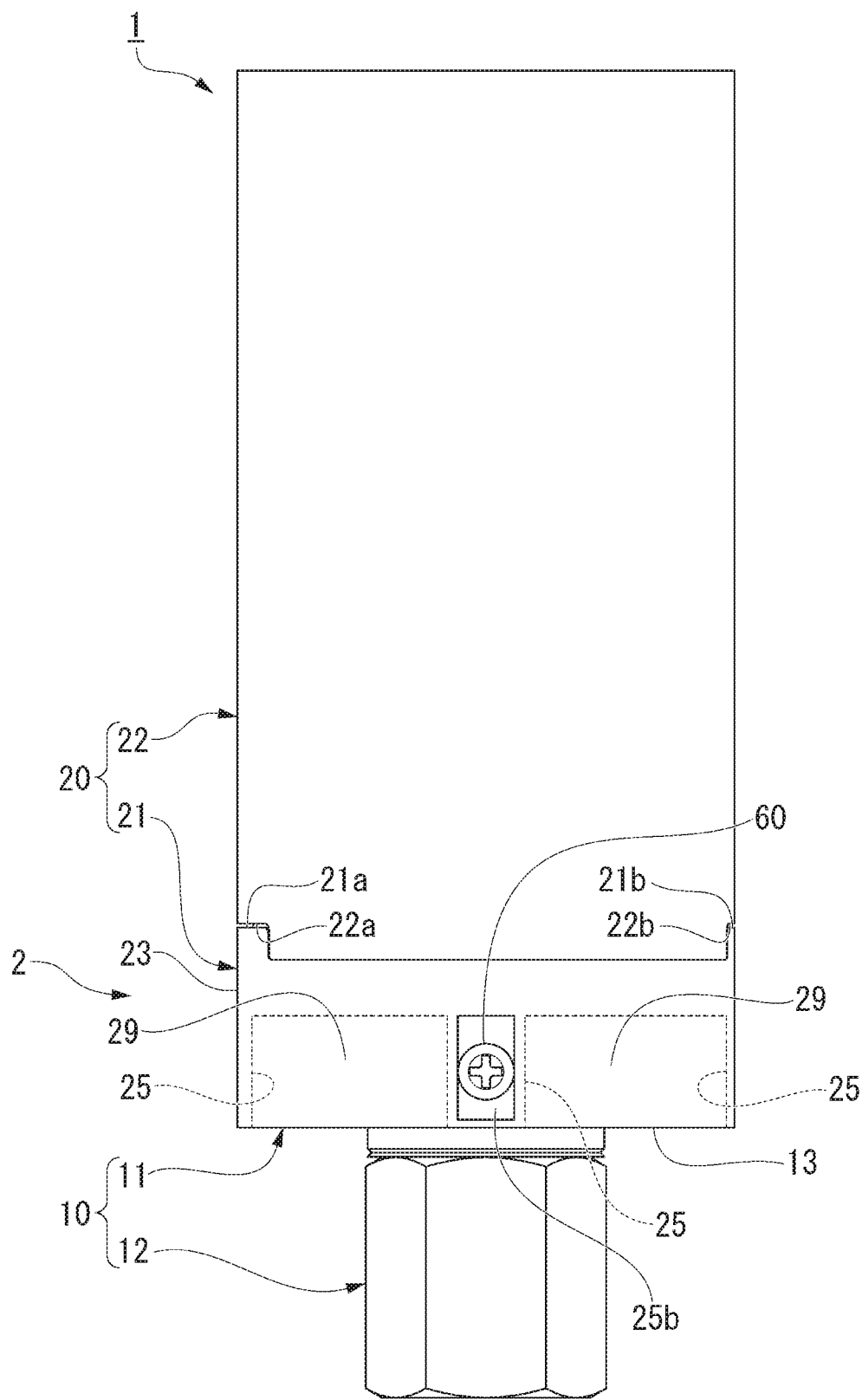
FIG. 10 is a front view illustrating a modification of the measuring instrument in the embodiment of the present invention.
Figure 11:
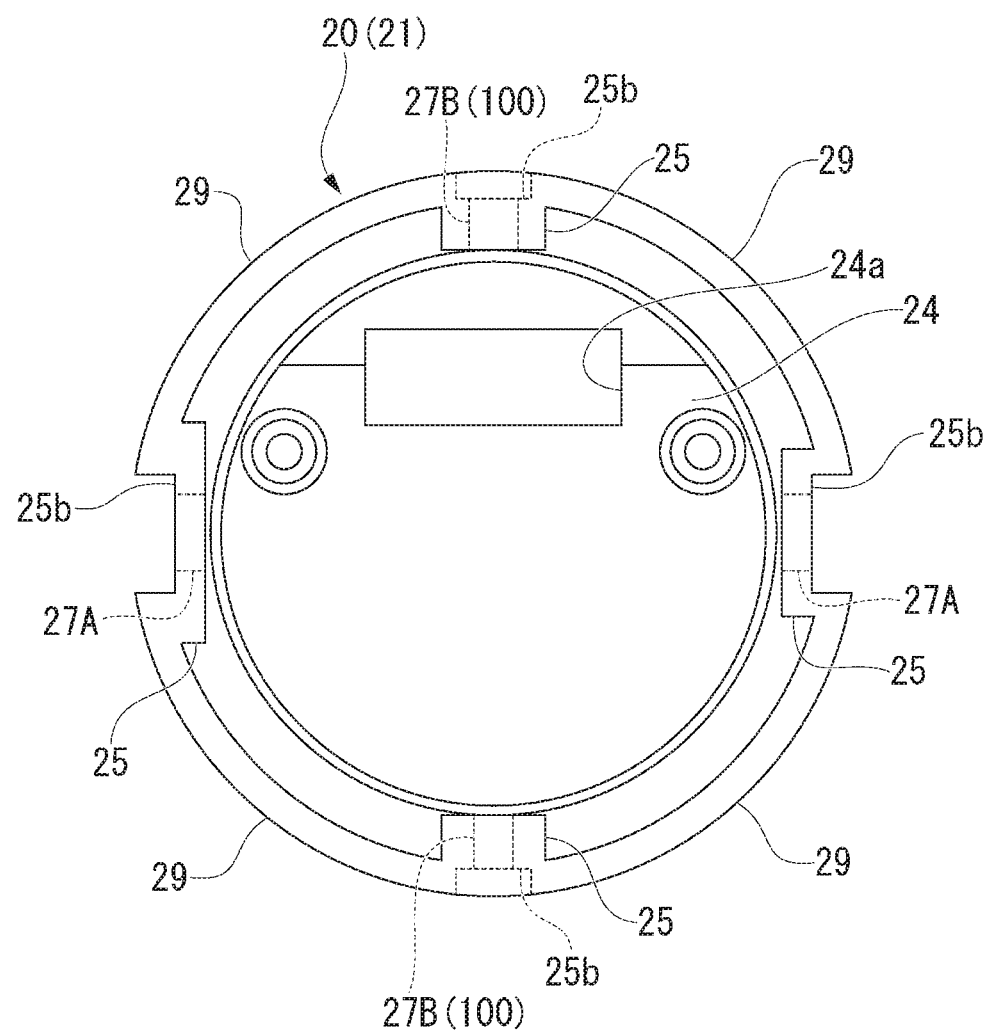
FIG. 11 is a bottom view of the second module with which the measuring instrument illustrated in FIG. 10 is provided.

FIG. 10 is a front view illustrating a modification of the measuring instrument 1 in the embodiment of the present invention. FIG. 11 is a bottom view of a second module 20 with which the measuring instrument 1 illustrated in FIG. 10 is provided. In the description of FIGS. 10 and 11, components identical or equivalent to the aforementioned embodiment are given the same reference signs, and description thereof will be simplified or omitted.

As illustrated in FIG. 10, a second module 20 may have a connecting wall 29 that is connected between the fitting protrusions 25. The connecting wall 29 is formed in an annular shape to surround the outside of the first module 10 in a radial direction (see FIG. 11). It is also said that the connecting wall 29 is interposed between the fitting protrusions 25.

The fitting protrusions 25 according to this modification are formed to be recessed (projected) inward from the connecting wall 29 in the radial direction. In place of the plane parts 25a, recesses 25b are formed in the fitting protrusions 25. The first restraints 27A (the first insertion holes 26A) or the second restraints 27B (the second insertion holes 26B) that have tubular shapes and are described above are formed in the recesses 25b. The same operation and effects as the aforementioned embodiment are also obtained by this constitution.

For example, in the above embodiment, the constitution that has the movable fixing pins 50 and the fastening screws 60 as the fixing members has been described, but the fixing members may be only any one of the movable fixing pins 50 and the fastening screws 60. That is, in a case where the fixing members are only the movable fixing pins 50, the fixing member holders 100 (the first screw holes 18A) are provided only in the first module 10. Further, in a case where the fixing members are only the fastening screws 60, the fixing member holders 100 (the second restraints 27B) are provided only in the second module 20. Further, the number and disposition of the fixing members may be arbitrary, and are not limited to the above embodiment (four and the intervals of) 90°.

For example, in the above embodiment, the constitution in which the module connection structure 2 is applied to the measuring instrument 1 in which the explosion-proof area is installed has been described, but it goes without saying that the module connection structure 2 can also be applied to the measuring instrument 1 that is installed in a place other than the explosion-proof area. Further, the module connection structure 2 is not limited to the measuring instrument 1, and can be applied to whole electronics to which the first module 10 and the second module 20 are connected via the connectors 31 and 41. Further, the connectors 31 and 41 are not also limited to the connectors for substrate-to-substrate connection, and may be connectors that are connected between electronic parts.

[Supplementary Note]

To solve the problems, a module connection structure of the present invention adopts a constitution that includes: a first module; a second module connected to the first module via connectors; and fixing members that fix the second module to the first module, wherein the fixing members are movable between a fixed position at which the second module is inseparable from the first module and an unfixed position at which the second module is separable from the first module, and at least any one of the first module and the second module has fixing member holders that hold the fixing members located at least at the unfixed position.

According to this constitution, when the fixing members that fix the second module to the first module is moved to the unfixed position, the fixing members are held in at least any one of the first module and the second module by the fixing member holders. In this way, the fixing members are held in at least any one of the first module and the second module, and thereby a risk of the fixing members falling from the module is removed so that a loss of the fixing members can be prevented.

Further, the present invention adopts a constitution in which the first module has a plurality of fitting recesses that extend in a connecting direction of the connectors, and the second module has a plurality of fitting protrusions that are inserted into the plurality of fitting recesses in the connecting direction of the connectors.

According to this constitution, since the connecting direction of the connectors is the same as an inserting direction of the fitting protrusions into the fitting recesses, the connectors can be accurately connected while guiding the plurality of fitting protrusions through the plurality of fitting recesses.

Further, the present invention adopts a constitution in which the first module has first screw holes that are provided in fitting surfaces of the fitting recesses and act as the fixing member holders, and movable fixing pins that act as the fixing members, are screwed into the first screw holes, and are movable between the fixed position at which the movable fixing pins protrude from the fitting surfaces and the unfixed position at which the movable fixing pins do not protrude from the fitting surfaces, and the second module has first insertion holes which are provided in the fitting protrusions and into which the movable fixing pins located at the fixed position are inserted.

According to this constitution, the movable fixing pins becoming the fixing members are screwed into the first screw holes that act as the fixing member holders and are provided in the fitting recesses, and are held in the first module. When the movable fixing pins are moved to the unfixed position, the movable fixing pins enter the first module without protruding from the fitting surfaces of the fitting recesses, and thus falling of the movable fixing pins is prevented. Further, when the movable fixing pins are moved to the fixed position, the movable fixing pins are inserted into the first insertion holes provided in the fitting protrusions of the second module, and prevent coming-off of the second module (the fitting protrusions) from the first module (the fitting recesses). Thus, reliability of the connection between the connectors can be maintained.

Further, the present invention adopts a constitution that has first restraints that are provided in the first insertion holes and restrain the movable fixing pins from falling from the first screw holes.

According to this constitution, the first restraints, which restrain the movable fixing pins from falling from the first screw holes, are provided in the first insertion holes, and the falling of the movable fixing pins protruding from the fitting surfaces can be prevented.

Further, the present invention adopts a constitution in which the first module has a first fitting recess and a second fitting recess as the fitting recesses in which the first screw holes are provided, the second module has a first fitting protrusion inserted into the first fitting recess and a second fitting protrusion inserted into the second fitting recess as the fitting protrusions in which the first insertion holes are provided, and fitting widths of the first fitting recess and the first fitting protrusion are different from widths of the second fitting recess and the second fitting protrusion.

According to this constitution, since fitting between the first fitting recesses and the second fitting protrusions and fitting between the second fitting recesses and the first fitting protrusions are not possible, a mounting direction of the second module on the first module is easily understood, and the second module can be prevented from being mounted on the first module in a reverse direction. Further, damage to the connectors can be prevented without an excessive force being applied to the connectors.

Further, the present invention adopts a constitution in which the first module has second screw holes that are provided in the fitting recesses, and the second module has second insertion holes that are provided in the fitting protrusions, and fastening screws that act as the fixing members, are inserted into the second insertion holes, and are movable between the fixed position at which the fastening screws are screwed into the second screw holes and the unfixed position at which the fastening screws are not screwed into the second screw holes, and the second module has second restraints that act as the fixing member holders and restrain the fastening screws located at the unfixed position from falling from the second insertion holes.

According to this constitution, the fastening screws becoming the fixing members pass through the second insertion holes provided in the fitting protrusions of the second module, and are screwed into the second screw holes provided in the fitting recesses of the first module, and thereby the second module is fixed to the first module. The second restraints acting as the fixing member holders are provided in the second insertion holes, and the fastening screws are held in the second module by the second restraints. When the fastening screws are moved to the unfixed position, the fastening screws are restrained from falling from the second insertion holes by the second restraints, and thus the loss of the fastening screws can be prevented.

Further, the present invention adopts a constitution in which the fitting protrusions are inserted into the fitting recesses, and a connection by the connectors is initiated while the fitting protrusions are being fitted into the fitting recesses.

According to this constitution, since the fitting protrusions are inserted into the fitting recesses, and the connection by the connectors is initiated in a state in which the second module is positioned to the first module, and thus the connectors can be accurately connected.

Further, the present invention adopts a constitution in which an axial direction is a direction in which a central axis of the module connection structure extends, a first fitting length is a length by which the fitting protrusions and the fitting recesses overlap each other in the axial direction, a second fitting length is a length by which one connector of the connectors is inserted into another connector of the connectors in the axial direction, and the first fitting length is longer than the second fitting length.

According to this constitution, since the fitting protrusions are inserted into the fitting recesses, and the connection by the connectors is initiated in a state in which the second module is positioned to the first module, and thus the connectors can be accurately connected.

Further, the present invention adopts a constitution in which the fixing members are provided to be movable between the fixed position and the unfixed position in an orthogonal direction perpendicular to the connecting direction of the connectors.

According to this constitution, each of the first module and the second module is provided with, for example, a flange, and there is no need to butt and fix the flanges in the connecting direction of the connectors. Thus, the modules can be miniaturized.

Further, the present invention adopts a constitution that has a seal ring that seals a gap between the first module and the second module.

According to this constitution, the gap between the first module and the second module is sealed by the seal ring, and intrusion of a liquid into interiors of the modules from the gap between the modules can be obstructed. Thus, a waterproof structure suitable for use in a field area can be established.

Further, a measuring instrument of the present invention adopts a constitution in which the measuring instrument includes a first module including a first substrate connected to a sensor; a second module including a second substrate connected to the first substrate via connectors, the second module being connected to be separable from the first module; and the module connection structure described above as a module connection structure between the first module and the second module.

According to this constitution, in the measuring instrument in which the first substrate inside the first module and the second substrate inside the second module are connected by the connectors for substrate-to-substrate connection, falling of the fixing members can be prevented. Thus, for example, the measuring instrument suitable for installation of an explosion-proof area is obtained. Further, reliability of the connection between the connectors of the modules can be maintained.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A module connection structure comprising:
   a first module;
   a second module connected to the first module via connectors; and
   fixing members that fix the second module to the first module,
   wherein the fixing members are movable between a fixed position at which the second module is inseparable from the first module and an unfixed position at which the second module is separable from the first module, and
   wherein at least one of the first module and the second module has fixing member holders that hold the fixing members located at least at the unfixed position,
   wherein the first module has a plurality of fitting recesses that extend in a connecting direction of the connectors,
   wherein the second module has a plurality of fitting protrusions that are inserted into the plurality of fitting recesses in the connecting direction of the connectors,
   wherein the first module has first screw holes that are provided in fitting surfaces of the plurality of fitting recesses and act as the fixing member holders,
   wherein movable fixing pins that act as the fixing members, are screwed into the first screw holes, and are movable between the fixed position at which the movable fixing pins protrude from the fitting surfaces and the unfixed position at which the movable fixing pins do not protrude from the fitting surfaces,
   wherein the second module has first insertion holes which are provided in the plurality of fitting protrusions and into which the movable fixing pins located at the fixed position are inserted,
   wherein the first module has a first fitting recess and a second fitting recess as the first fitting recess and the second fitting recess of the plurality of fitting recesses in which the first screw holes are provided,
   wherein the second module has a first fitting protrusion inserted into the first fitting recess and a second fitting protrusion inserted into the second fitting recess as the first fitting protrusion and the second fitting protrusion of the plurality of fitting protrusions in which the first insertion holes are provided, and
   wherein fitting widths of the first fitting recess and the first fitting protrusion are different from widths of the second fitting recess and the second fitting protrusion.

2. The module connection structure according to claim 1, further comprising:
   first restraints that are provided in the first insertion holes and restrain the movable fixing pins from falling from the first screw holes.

3. The module connection structure according to claim 1, wherein the plurality of fitting protrusions are inserted into the plurality of fitting recesses, and a connection by the connectors is initiated while the plurality of fitting protrusions are being fitted into the plurality of fitting recesses.

4. The module connection structure according to claim 3,
   wherein an axial direction is a direction in which a central axis of the module connection structure extends,
   wherein a first fitting length is a length by which the plurality of fitting protrusions and the plurality of fitting recesses overlap each other in the axial direction,
   wherein a second fitting length is a length by which one connector of the connectors is inserted into another connector of the connectors in the axial direction, and
   wherein the first fitting length is longer than the second fitting length.

5. The module connection structure according to claim 1,
   wherein the fixing members are provided to be movable between the fixed position and the unfixed position in an orthogonal direction perpendicular to a connecting direction of the connectors.

6. The module connection structure according to claim 1, further comprising:
   a seal ring that seals a gap between the first module and the second module.

7. A module connection structure comprising:
   a first module;
   a second module connected to the first module via connectors; and
   fixing members that fix the second module to the first module,
   wherein the fixing members are movable between a fixed position at which the second module is inseparable from the first module and an unfixed position at which the second module is separable from the first module, and
   wherein at least one of the first module and the second module has fixing member holders that hold the fixing members located at least at the unfixed position,
   wherein the first module has a plurality of fitting recesses that extend in a connecting direction of the connectors,
   wherein the second module has a plurality of fitting protrusions that are inserted into the plurality of fitting recesses in the connecting direction of the connectors,
   wherein the first module has second screw holes that are provided in the fitting recesses,
   wherein the second module has second insertion holes that are provided in the fitting protrusions,
   wherein fastening screws that act as the fixing members, are inserted into the second insertion holes, and are movable between the fixed position at which the fastening screws are screwed into the second screw holes and the unfixed position at which the fastening screws are not screwed into the second screw holes, and
   wherein the second module has second restraints that act as the fixing member holders and restrain the fastening screws located at the unfixed position from falling from the second insertion holes.

8. A measuring instrument comprising:
a first module comprising a first substrate connected to a sensor;
a second module comprising a second substrate connected to the first substrate via connectors, the second module being connected to be separable from the first module; and
the module connection structure according to claim 1 as a module connection structure between the first module and the second module,
wherein the first module has a plurality of fitting recesses that extend in a connecting direction of the connectors,
wherein the second module has a plurality of fitting protrusions that are inserted into the plurality of fitting recesses in the connecting direction of the connectors,
wherein the first module has first screw holes that are provided in fitting surfaces of the plurality of fitting recesses and act as the fixing member holders,
wherein movable fixing pins that act as the fixing members, are screwed into the first screw holes, and are movable between the fixed position at which the movable fixing pins protrude from the fitting surfaces and the unfixed position at which the movable fixing pins do not protrude from the fitting surfaces,
wherein the second module has first insertion holes which are provided in the plurality of fitting protrusions and into which the movable fixing pins located at the fixed position are inserted,
wherein the first module has a first fitting recess and a second fitting recess as the first fitting recess and the second fitting recess of the plurality of fitting recesses in which the first screw holes are provided,
wherein the second module has a first fitting protrusion inserted into the first fitting recess and a second fitting protrusion inserted into the second fitting recess as the first fitting protrusion and the second fitting protrusion of the plurality of fitting protrusions in which the first insertion holes are provided, and
wherein fitting widths of the first fitting recess and the first fitting protrusion are different from widths of the second fitting recess and the second fitting protrusion.

9. The measuring instrument according to claim 8, further comprising:
first restraints that are provided in the first insertion holes and restrain the movable fixing pins from falling from the first screw holes.

10. The measuring instrument according to claim 8,
wherein the plurality of fitting protrusions are inserted into the plurality of fitting recesses, and a connection by the connectors is initiated while the plurality of fitting protrusions are being fitted into the plurality of fitting recesses.

11. The measuring instrument according to claim 10,
wherein an axial direction is a direction in which a central axis of the module connection structure extends,
wherein a first fitting length is a length by which the plurality of fitting protrusions and plurality of the fitting recesses overlap each other in the axial direction,
wherein a second fitting length is a length by which one connector of the connectors is inserted into another connector of the connectors in the axial direction, and
wherein the first fitting length is longer than the second fitting length.

12. The measuring instrument according to claim 8,
wherein the fixing members are provided to be movable between the fixed position and the unfixed position in an orthogonal direction perpendicular to a connecting direction of the connectors.

13. The measuring instrument according to claim 8, further comprising:
a seal ring that seals a gap between the first module and the second module.

14. The A measuring instrument comprising:
a first module comprising a first substrate connected to a sensor;
a second module comprising a second substrate connected to the first substrate via connectors, the second module being connected to be separable from the first module; and
the module connection structure according to claim 1 as a module connection structure between the first module and the second module,
wherein the first module has a plurality of fitting recesses that extend in a connecting direction of the connectors,
wherein the second module has a plurality of fitting protrusions that are inserted into the plurality of fitting recesses in the connecting direction of the connectors,
wherein the first module has second screw holes that are provided in the fitting recesses,
wherein the second module has second insertion holes that are provided in the fitting protrusions,
wherein fastening screws that act as the fixing members, are inserted into the second insertion holes, and are movable between the fixed position at which the fastening screws are screwed into the second screw holes and the unfixed position at which the fastening screws are not screwed into the second screw holes, and
wherein the second module has second restraints that act as the fixing member holders and restrain the fastening screws located at the unfixed position from falling from the second insertion holes.

* * * * *